(12) United States Patent
Groff

(10) Patent No.: US 11,711,866 B1
(45) Date of Patent: Jul. 25, 2023

(54) SERVICE PRIORITIZATION USING CITIZENS BROADBAND RADIO SERVICE BASED ON EMBEDDED SUBSCRIBER IDENTITY MODULES

(71) Applicant: DISH Wireless L.L.C., Englewood, CO (US)

(72) Inventor: Montgomery N Groff, Denver, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/733,803

(22) Filed: Apr. 29, 2022

(51) Int. Cl.
*H04W 4/60* (2018.01)
*H04W 8/18* (2009.01)
*H04W 76/20* (2018.01)
*H04W 4/50* (2018.01)

(52) U.S. Cl.
CPC ............. *H04W 76/20* (2018.02); *H04W 4/50* (2018.02)

(58) Field of Classification Search
CPC ......... H04W 76/20; H04W 4/50; H04W 4/60; H04W 8/18; H04W 12/72; H04W 72/56
See application file for complete search history.

(56) References Cited

U.S. PATENT DOCUMENTS

| | | | |
|---|---|---|---|
| 10,939,268 B1* | 3/2021 | Roy | H04W 4/20 |
| 2009/0175235 A1* | 7/2009 | Spinar | H04W 72/23 370/468 |
| 2015/0312717 A1* | 10/2015 | Shih | H04W 4/025 455/456.1 |
| 2020/0322846 A1* | 10/2020 | Hampali | H04W 8/205 |
| 2021/0289412 A1* | 9/2021 | Zhang | H04W 8/183 |
| 2022/0038982 A1* | 2/2022 | Boyapalle | H04W 36/0088 |
| 2022/0110079 A1* | 4/2022 | Singh | H04W 60/04 |
| 2022/0295262 A1* | 9/2022 | Shahidi | H04W 8/183 |
| 2022/0361134 A1* | 11/2022 | Chandramouli | H04W 60/005 |
| 2022/0394492 A1* | 12/2022 | Chaugule | H04W 4/021 |

* cited by examiner

Primary Examiner — Andrew Wendell
(74) Attorney, Agent, or Firm — Seed IP Law Group LLP

(57) ABSTRACT

A Citizens Broadband Radio Service (CBRS) system can receive, from a mobile device, a request to establish a communicative connection, and in response to receiving the request, cause an embedded subscriber identity module (eSIM) of the device to be provisioned with a priority level of wireless service. The system can change the priority level of the eSIM based, at least in part, on assessment of the device's activity in accordance with one or more prioritization criteria, and cause establishment or adjustment of the communicative connection of the device in accordance with the priority level.

20 Claims, 4 Drawing Sheets

SERVICE PRIORITIZATION USING CITIZENS BROADBAND RADIO SERVICE BASED ON EMBEDDED SUBSCRIBER IDENTITY MODULES

BACKGROUND

Technical Field

The present application is related to wireless service management for a private network based on embedded subscriber identity module (eSIM) provisioning and management, in particular, in the context of Citizens Broadband Radio Service (CBRS).

Description of the Related Art

The proliferation of eSIM-enabled devices resulted in the replacement or enhancement of physical SIM cards and giving subscribers instant connectivity to communication networks. eSIMs permit remote or "over-the-air" provisioning by carriers of communication plan privileges. Further, an eSIM allows a device to have multiple profiles without swapping physical cards or allocating space for multiple cards. The flexibility of remote provisioning gives service providers wide ranging capability in configuring the services offered to their customers and subscribers on various devices.

DETAILED DESCRIPTION

Figure 1:
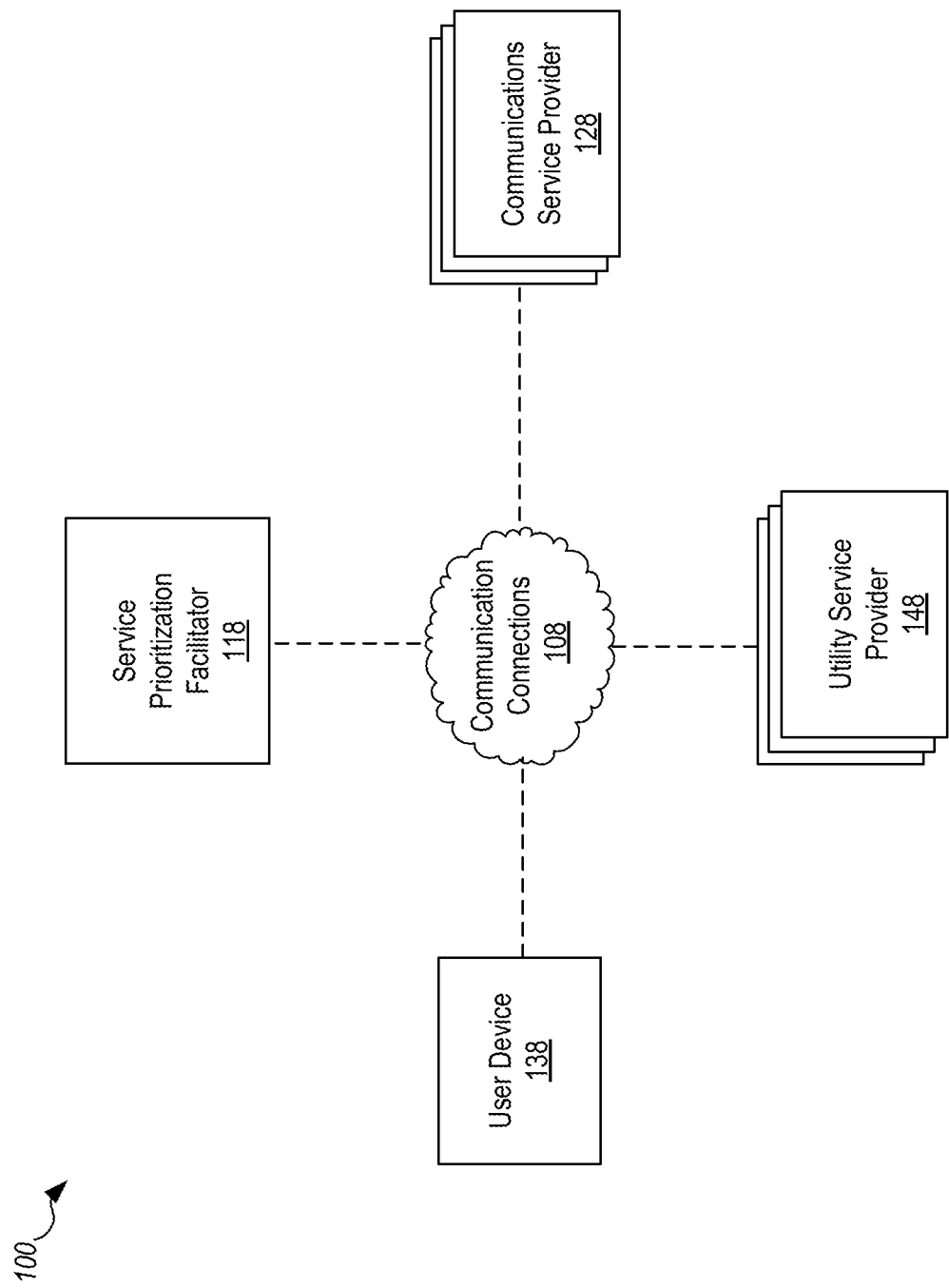
FIG. 1 is a block diagram illustrating an example networked environment for facilitating prioritization of wireless services in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Citizens Broadband Radio Service (CBRS) refers to 150 MHz of spectrum in the 3550 MHz to 3700 MHz range (3.5 GHz to 3.7 GHz) that the United States Federal Communications Commission (FCC) has designated for sharing among three tiers of users: incumbent users, priority access license (PAL) users and general authorized access (GAA) users. A CBRS node or a set of CBRS nodes can be used for radio access network (RAN) sharing. For example, two commonly used RAN sharing solutions are known as MOCN (Multi Operator Core Network) and MORAN (Multi Operator RAN). With MORAN everything in the RAN (e.g., antenna, tower, site, and power) except the radio carriers is shared between two or more operators. With MOCN, two or more core networks share the same RAN meaning the carriers are shared. The existing core networks can be kept separate.

When a cell site (e.g., in a hotel, stadium, office building, or the like) of a private wireless network, such as a cell site associated with a CBRS node, is operating as a MOCN or a part thereof, it may broadcast the public land mobile networks (PLMNs) of multiple mobile network operators (MNOs). In this way, a mobile device that subscribes to the service of a particular MNO still determines that it is on the network of the MNO when in reality the device is connected to the CBRS node. Typically, all MNOs have equivalent or similar service while on the CBRS node.

The mobile device can acquire or otherwise be equipped with a programmable or configurable eSIM, where wireless service priority associated with the eSIM can be changed such that a particular PLMN associated with the cell site can be the PLMN of a highest level priority for a the mobile device. When the mobile device is within the service range of the cell site, it can join the particular PLMN of the cell site instead of or in conjunction with the PLMN associated with its subscribed network. In some embodiments, the particular PLMN of the cell site can be set to a higher level or otherwise superior service-level agreement (SLA) than the PLMN of any other MNO such that the CBRS node prioritizes the traffic of the mobile device, which has the eSIM provisioned with high priority service.

In some embodiments, a CBRS system including one or more CBRS nodes can receive, from a device, a request to establish a communicative connection, and in response to receiving the request, cause an eSIM of the device to be provisioned with a priority level of wireless service. The system can change the priority level of the eSIM based on assessment of the device's activity in accordance with one or more prioritization criteria, and cause establishment or adjustment of the communicative connection of the device in accordance with the priority level.

In some embodiments, the device includes a first mobile device that subscribes to a wireless service of a first MNO. In some embodiments, the provisioned priority level of wireless service corresponds to the wireless service of the first MNO. In some embodiments, changing the priority level of the eSIM comprises changing the priority level to enable a wireless service superior to the wireless service of the first MNO. In some embodiments, the enabled wireless service is superior to the wireless service of the first MNO in at least one of data transmission, bandwidth, or data routing.

In some embodiments, the system can further receive, from a second mobile device, another request to establish a communicative connection, and in response to receiving the other request, cause another eSIM of the second mobile device to be provisioned with another priority level of wireless service. The system can change the other priority level of the other eSIM based, at least in part, on assessment of the second mobile device's activity in accordance with the one or more prioritization criteria, and cause establishment or adjustment of the communicative connection of the second mobile device in accordance with the other priority level.

In some embodiments, the second mobile device subscribes to a wireless service of a second MNO. In some embodiments, the provisioned another priority level of wireless service corresponds to the wireless service of the second MNO. In some embodiments, changing the other priority level of the other eSIM comprises changing the other priority level to enable a wireless service superior to the wireless service of the second MNO.

FIG. 1 is a block diagram illustrating an example networked environment 100 for facilitating prioritization of wireless services in accordance with some embodiments of the techniques described herein. The networked environment 100 includes a service prioritization facilitator 118, one or more communications service providers (CSPs) 128, a user device 138, and one or more network utility service providers 148. The user device 138 can be connected to utility service provider(s) 148 via at least some part of communication connections 108, which are at least partially subject to control by one or more of the CSP(s) 128. The CSPs 128 can include, for example, a private wireless service provider operating a CBRS system that controls one or more CBRS nodes, as well as one or more other MNOs facilitated by the CBRS system.

In the depicted networked environment 100, the communication connections 108 may comprise one or more computer networks, one or more wired or wireless networks, satellite transmission media, one or more cellular networks, or some combination thereof. The communication connections 108 may include a publicly accessible network of linked networks, possibly operated by various distinct parties, such as the Internet. The communication connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 108 may include various types of wired and/or wireless networks in various situations, including satellite transmission. In addition, the communication connections 108 may include one or more communication interfaces to individual entities in the networked environment 100, various other mobile devices, computing devices and media devices, including but not limited to, radio frequency (RF) transceivers, cellular communication interfaces and antennas (e.g., CBRS nodes or other cellular nodes), USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a user device 138 include, but are not limited to, one or a combination of the following: a "computer," "mobile device," "gaming console," "tablet computer," "smart phone," "handheld computer," and/or "workstation," etc. The user device(s) 138 may be any suitable computing device or electronic equipment that, e.g., can be equipped with one or more eSIMs and is able to communicate with the service prioritization facilitator 118 and the utility service provider(s) 148. The eSIM is remotely (or "over the air") provisionable, for example, as provided in GSM Association Document SGP.22 RSP Technical Specification, Version 2.2.2, Jun. 5, 2020. In addition to an initial provisioning, subsequent changes (e.g., from one operator to another) may be made.

In various embodiments, the service prioritization facilitator 118 can include one or more computing devices for performing the service prioritization facilitating functions described herein. The service prioritization facilitator 118 can include functional units for processing requests from user devices, providing or provisioning eSIMs, assessing user device activity in accordance with prioritization criteria, as well as facilitating establishment of communicative connections (e.g., between user devices and utility service providers) in accordance with eSIM priority level (e.g., via private network or the user device's subscribed network). Illustratively, the service prioritization facilitator 118 can include one or more servers that have storage, such as a memory, configured to store a list of identifiers of eSIMs provisioned. The list may be a "white list" of identifiers of eSIMs, eSIM profiles or identifiers of eSIM profiles permitted by the provider to access the communication network (for example, the private wireless network managed by the CBRS system). In some embodiments, the service prioritization facilitator 118 is part of a CSP 128 (e.g., an element in the core network of a private wireless service provider).

In various embodiments, individual CSPs 128 and utility service providers 148 can be implemented in software and/or hardware form on one or more computing devices including a "computer," "mobile device," "tablet computer," "smart phone," "handheld computer," "server," and/or "workstation," etc. The utility service provider(s) 148 can provide content, service, forum, and/or other network utilities.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
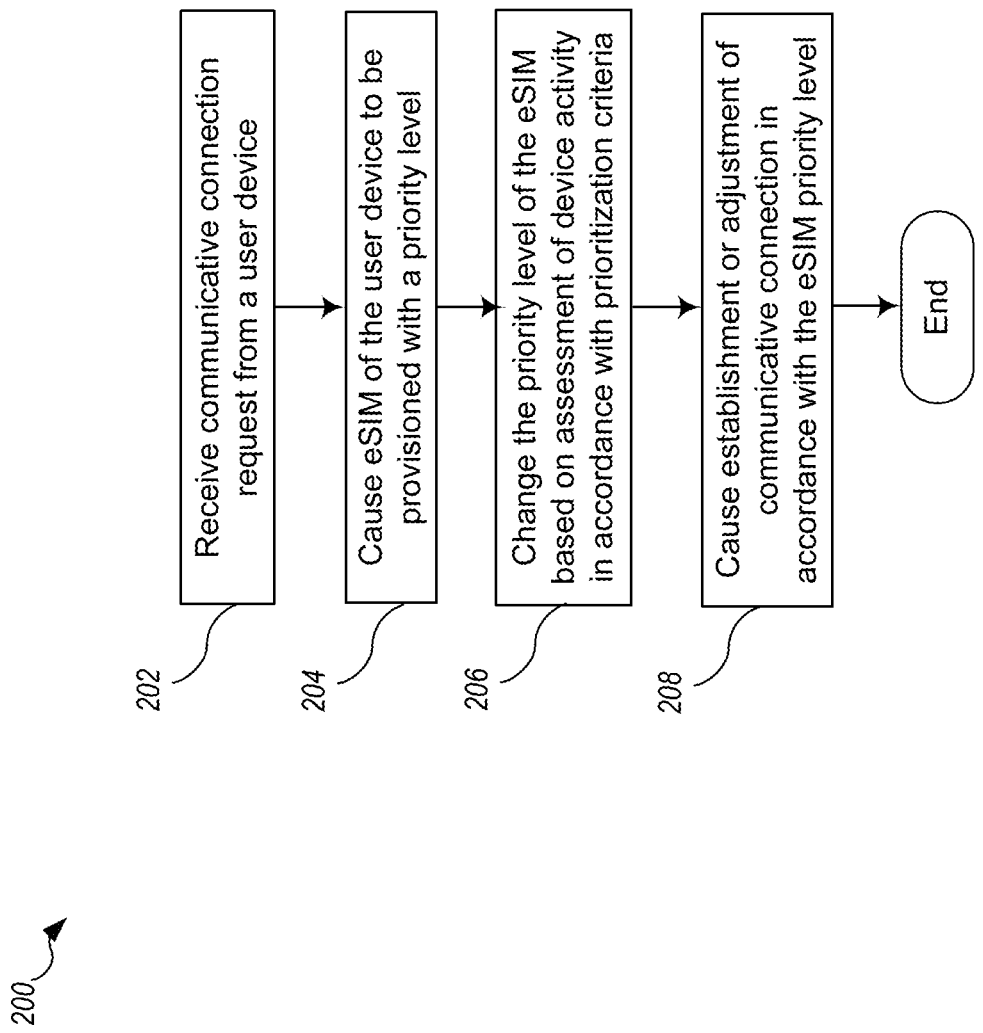
FIG. 2 is a flow diagram depicting an example process for facilitating prioritization of wireless services in accordance with some embodiments of the techniques described herein.

FIG. 2 is a flow diagram depicting an example process 200 for facilitating prioritization of wireless services in accordance with some embodiments of the techniques described herein. In various embodiments, the process 200 is performed in real time, and at least some part of the process 200 is performed in a transparent manner to a user of the user device. Illustratively, at least some part of the process 200 can be implemented by the service prioritization facilitator 118 of FIG. 1.

The process 200 starts at block 202, which includes receiving a request from a user device 138 for communicative connection(s). The request can include one or more identifiers of the user device, and in some embodiments, can include one or more identifiers of eSIM(s) already acquired by the user device. In some embodiments, the request includes system information and/or status of the user device (e.g., its model, configuration, computing power, storage capacity, communication capability, and/or active applications). In some embodiments, this request is received as a CBRS node detects the user device within its wireless service coverage.

At block 204, the process 200 includes causing an eSIM of the user device to be provisioned with a priority level of service. In various embodiments, if the user device currently does not have an eSIM provisionable by the service prioritization facilitator 118, the process 200 can further include providing such an eSIM to the user device (e.g., via a QR code, text message, Web portal, or the like).

In some embodiments, the user device is a mobile device that subscribes to a wireless service of a particular MNO supported by the CBRS node. The initially provisioned priority level of wireless service can correspond to the wireless service of that MNO. Illustratively, the user device is assigned to a PLMN associated with that MNO and set to a standard SLA accordingly.

At block 206, the process 200 includes changing the priority level of the eSIM based on assessment of device activity in accordance with one or more prioritization criteria. Illustratively, the one or more prioritization criteria can be provided to the user device at the time the eSIM is provided to the user device. In some embodiments, the one or more prioritization criteria is maintained by the service prioritization facilitator and not provided to the user device.

The prioritization criteria can include one or more thresholds of wireless data usage, category of utility service providers to connect, user status relative to the private wireless network associated with the service prioritization facilitator 118, combination of the same or the like.

By assessing the communicative or other activity of the user device, the service prioritization facilitator 118 can determine whether one or more of the criteria are satisfied. If so, the service prioritization facilitator 118 can change the priority level of the eSIM to enable a wireless service superior to the wireless service of the MNO. In some embodiments, the enabled wireless service is superior to the wireless service of the MNO via faster data transmission, broader bandwidth, or more direct data routing. The enabled wireless service can correspond to a PLMN associated with the private wireless network associated with the service prioritization facilitator 118 and set to a higher level SLA. In some embodiments, the enabled wireless service can function concurrently with that of the MNO initially assigned to the user device. For example, the enabled wireless service can provide high-speed, broadband data connection to the user device while it maintains voice or text service via the MNO.

At block 208, the process 200 includes causing establishment or adjustment of communicative connection(s) of the user device in accordance with the eSIM priority level. Illustratively, the service prioritization facilitator 118 communicates timing and procedures (e.g., for performing PLMN switch over or adding a new communication channel) with the user device. Blocks 206 and 208 can be performed repeatedly, periodically, or as triggered by new events such as a change of user device activity or user status. Further, some or all the blocks of process 200 can be performed for one or more other user devices and their corresponding MNO(s), concurrently or sequentially with the performing of a current process 200.

Figure 3:
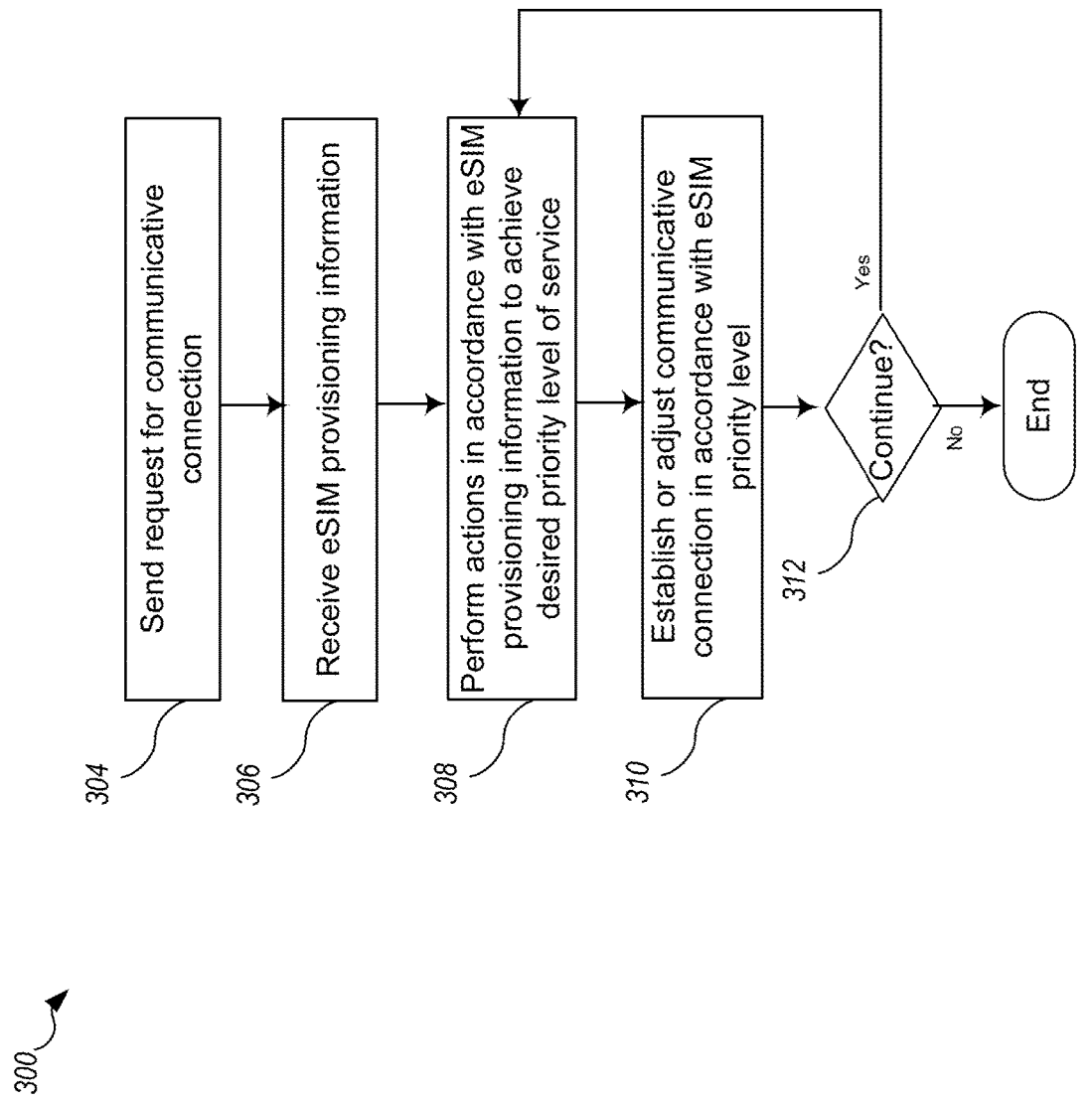
FIG. 3 is a flow diagram depicting an example process for requesting and establishing communicative connection(s) in accordance with some embodiments of the techniques described herein.

FIG. 3 is a flow diagram depicting an example process 300 for requesting and establishing communicative connection(s) in accordance with some embodiments of the techniques described herein. In various embodiments, the process 300 is performed in real time, and at least some part of the process 300 is performed in a transparent manner to a user of the user device. Illustratively, at least some part of the process 300 can be implemented by the user device 138 of FIG. 1.

The process 300 starts at block 304, which includes sending a request for communicative connection(s) to the service prioritization facilitator 118. As previously stated, the request can include one or more identifiers of the user device, and in some embodiments, can include one or more identifiers of eSIM(s) already acquired by the user device. In some embodiments, the request includes system information and/or status of the user device (e.g., its model, configuration, computing power, storage capacity, communication capability, and/or active applications). In some embodiments, this request is sent as a CBRS node detects the user device within its wireless service coverage.

At block 306, the process 300 includes receiving eSIM provisioning information. In various embodiments, if the user device currently does not have an eSIM provisionable by the service prioritization facilitator 118, the user device can receive such an eSIM device (e.g., via a QR code, text message, Web portal, or the like). The eSIM provisioning information can include an initial priority level of wireless service for the user device. In some embodiments, the user device is a mobile device that subscribes to a wireless service of a particular MNO of multiple MNOs facilitated by the CBRS node. The initially provisioned priority level of wireless service can correspond to the wireless service of that MNO. Illustratively, the user device is assigned to a PLMN associated with that MNO and set to a standard SLA accordingly.

At block 308, the process 300 includes performing actions in accordance with the eSIM provisioning information to achieve a desired level of service. Illustratively, eSIM provisioning information can include one or more prioritization criteria. The prioritization criteria can include one or more thresholds of wireless data usage, category of utility service providers to connect, user status relative to the private wireless network associated with the service prioritization facilitator 118, combination of the same or the like. By performing actions to satisfy one or more of the criteria, the user device can inform, request, trigger, or otherwise cause the service prioritization facilitator 118 to change the priority level of the eSIM to enable a desired wireless service (e.g., superior to the wireless service of the MNO). The enabled wireless service can correspond to a PLMN associated with a private wireless network of multiple private wireless networks associated with the service prioritization facilitator 118 and set to a higher level SLA. In some embodiments, the enabled wireless service can function concurrently with that of the MNO initially assigned to the user device. For example, the enabled wireless service can provide high-speed, broadband data connection to the user device while it maintains voice or text service via the MNO.

At block 310, the process 300 includes establishing or adjusting communicative connection(s) of the user device in accordance with the eSIM priority level. Illustratively, the user device receives timing and procedures (e.g., for performing PLMN switch over or adding a new communication channel) from the service prioritization facilitator 118.

At block 312, the process 300 includes determining whether to continue the process. If so, the process proceeds to block 304; otherwise, the process ends.

Those skilled in the art will appreciate that the various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
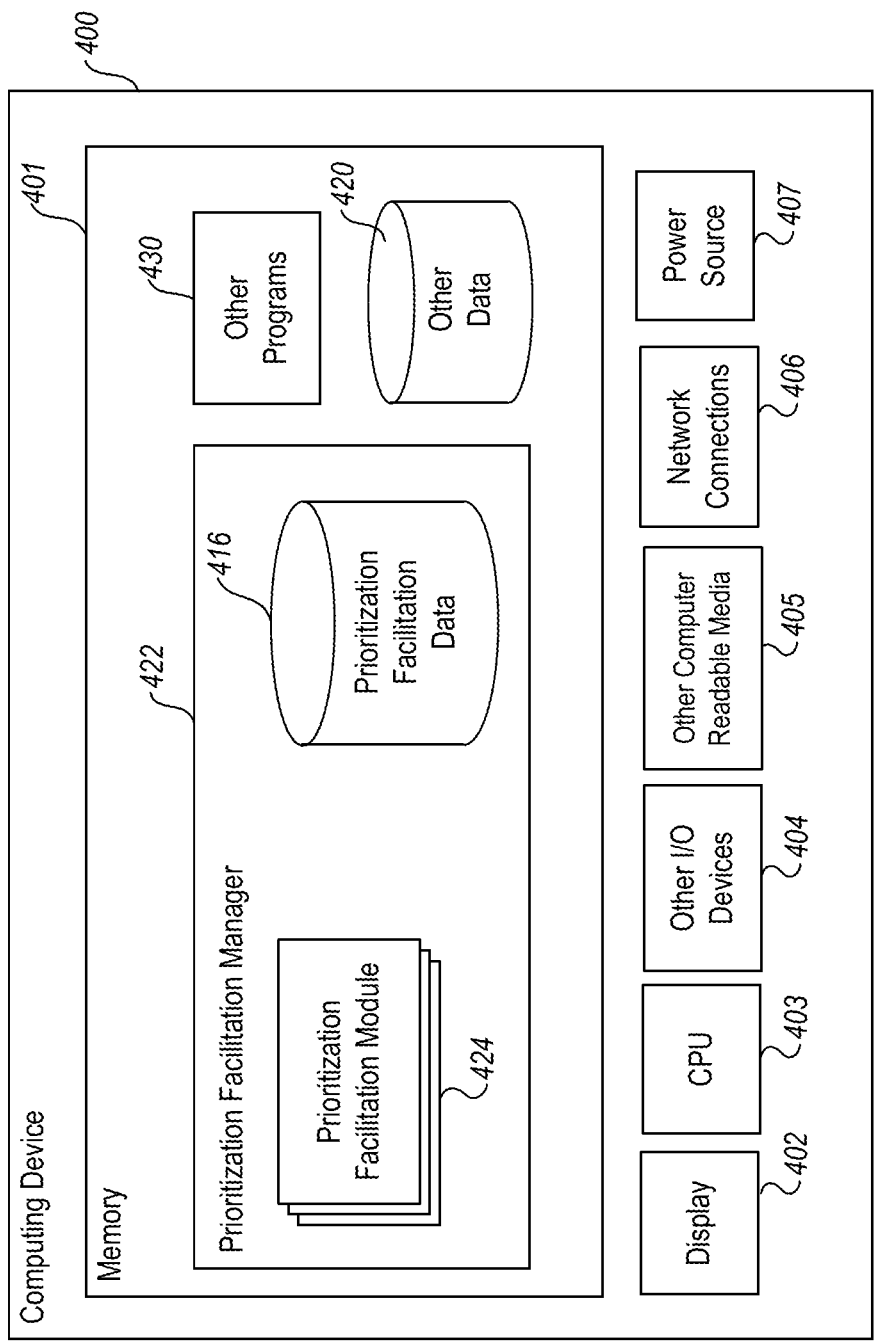
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a service prioritization facilitator 118, a CSP 128, a user device 138, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the communication facilitation manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units ("CPU") or other processors 403, Input/Output ("I/O") devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The prioritization facilitation manager 422 is shown residing in memory 401. In other embodiments, some portion of the contents and some, or all, of the components of the prioritization facilitation manager 422 may be stored on and/or transmitted over the other computer-readable media 405. The components of the computing device 400 and communication facilitation manager 422 can execute on one or more processors 403 and implement applicable functions described herein. In some embodiments, the prioritization facilitation manager 422 may operate as, be part of, or work in conjunction and/or cooperation with other software applications stored in memory 401 or on various other computing devices. In some embodiments, the prioritization facilitation manager 422 also facilitates communication with peripheral devices via the I/O devices 404, or with another device or system via the network connections 406.

The one or more prioritization facilitation modules 424 is configured to perform actions related, directly or indirectly, to facilitating and managing prioritization of wireless services for user device(s) as described herein. In some embodiments, the prioritization facilitation module(s) 424 stores, retrieves, or otherwise accesses at least some prioritization facilitation-related data on some portion of the prioritization facilitation data storage 416 or other data storage internal or external to the computing device 400. In various embodiments, at least some of the prioritization facilitation modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and prioritization facilitation manager 422 include API(s) that provides programmatic access to add, remove, or change one or more functions of the computing device 400. In some embodiments, components/modules of the computing device 400 and prioritization facilitation manager 422 are implemented using standard programming techniques. For example, the prioritization facilitation manager 222 may be implemented as an executable running on the processor(s) 403, along with one or more static or dynamic libraries. In other embodiments, the computing device 400 and prioritization facilitation manager 422 may be implemented as instructions processed by a virtual machine that executes as one of the other programs 430. In general, a range of programming languages known in the art may be employed for implementing such example embodiments, including representative implementations of various programming language paradigms, including but not limited to, objectoriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the prioritization facilitation manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a prioritization facilitation manager 422 implementation. Also, other functions could be implemented and/or performed by each component/module, and in different orders, and by different components/modules, yet still achieve the functions of the computing device 400 and prioritization facilitation manager 422.

In addition, programming interfaces to the data stored as part of the computing device 400 and prioritization facilitation manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The prioritization facilitation data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the prioritization facilitation manager 422.

Furthermore, in some embodiments, some or all of the components of the computing device 400 and prioritization facilitation manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Citizens Broadband Radio Service (CBRS) system, comprising:
one or more processors; and
memory storing contents that, when executed by the one or more processors, cause the CBRS system to perform actions comprising:
receiving, from a device, a request to establish a communicative connection;
in response to receiving the request, causing an embedded subscriber identity module (eSIM) of the device to be provisioned with a priority level of wireless service;
changing the priority level of the eSIM based, at least in part, on assessment of the device's activity in accordance with one or more prioritization criteria; and
causing establishment or adjustment of the communicative connection of the device in accordance with the priority level.

2. The CBRS system of claim 1, wherein the device includes a first mobile device that subscribes to a wireless service of a first mobile network operator.

3. The CBRS system of claim 2, wherein the provisioned priority level of wireless service corresponds to the wireless service of the first mobile network operator.

4. The CBRS system of claim 3, wherein changing the priority level of the eSIM comprises changing the priority level to enable a wireless service superior to the wireless service of the first mobile network operator.

5. The CBRS system of claim 4, wherein the enabled wireless service is superior to the wireless service of the first mobile network operator in at least one of data transmission, bandwidth, or data routing.

6. The CBRS system of claim 2, wherein the actions further comprise:
receiving, from a second mobile device, another request to establish a communicative connection;
in response to receiving the another request, causing another eSIM of the second mobile device to be provisioned with another priority level of wireless service;
changing the another priority level of the another eSIM based, at least in part, on assessment of the second mobile device's activity in accordance with the one or more prioritization criteria; and
causing establishment or adjustment of the communicative connection of the second mobile device in accordance with the another priority level.

7. The CBRS system of claim 6, wherein the second mobile device subscribes to a wireless service of a second mobile network operator.

8. The CBRS system of claim 7, wherein the provisioned another priority level of wireless service corresponds to the wireless service of the second mobile network operator.

9. The CBRS system of claim 8, wherein changing the another priority level of the another eSIM comprises changing the another priority level to enable a wireless service superior to the wireless service of the second mobile network operator.

10. A method for prioritizing wireless service associated with a private network, comprising:
receiving, from a device, a request to establish a communicative connection;
in response to receiving the request, causing an embedded subscriber identity module (eSIM) of the device to be provisioned with a priority level of wireless service;
changing the priority level of the eSIM based, at least in part, on assessment of the device's activity in accordance with one or more prioritization criteria; and
causing establishment or adjustment of the communicative connection of the device in accordance with the priority level.

11. The method of claim 10, wherein the device includes a first mobile device that subscribes to a wireless service of a first mobile network operator.

12. The method of claim 11, wherein the provisioned priority level of wireless service corresponds to the wireless service of the first mobile network operator.

13. The method of claim 12, wherein changing the priority level of the eSIM comprises changing the priority level to enable a wireless service superior to the wireless service of the first mobile network operator.

14. The method of claim 13, wherein the enabled wireless service is superior to the wireless service of the first mobile network operator in at least one of data transmission, bandwidth, or data routing.

15. The method of claim 10, further comprising:
receiving, from a second mobile device, another request to establish a communicative connection;
in response to receiving the another request, causing another eSIM of the second mobile device to be provisioned with another priority level of wireless service;
changing the another priority level of the another eSIM based, at least in part, on assessment of the second mobile device's activity in accordance with the one or more prioritization criteria; and
causing establishment or adjustment of the communicative connection of the second mobile device in accordance with the another priority level.

16. The method of claim 15, wherein the second mobile device subscribes to a wireless service of a second mobile network operator.

17. The method of claim 16, wherein the provisioned another priority level of wireless service corresponds to the wireless service of the second mobile network operator.

18. The method of claim 17, wherein changing the another priority level of the another eSIM comprises changing the another priority level to enable a wireless service superior to the wireless service of the second mobile network operator.

19. A non-transitory computer-readable medium storing contents that, when executed by the one or more processors, cause the one or more processors to perform actions comprising:
receiving, from a first mobile device associated with a first mobile network, a request to establish a communicative connection;
in response to receiving the request, causing an embedded subscriber identity module (eSIM) of the first mobile device to be provisioned with a priority level of wireless service;
changing the priority level of the eSIM based, at least in part, on assessment of the first mobile device's activity in accordance with one or more prioritization criteria; and
causing establishment or adjustment of the communicative connection of the first mobile device in accordance with the priority level.

20. The non-transitory computer-readable medium of claim 19, wherein the actions further comprise:
receiving, from a second mobile device associated with a second mobile network, another request to establish a communicative connection;
in response to receiving the another request, causing another eSIM of the second mobile device to be provisioned with another priority level of wireless service;
changing the another priority level of the another eSIM based, at least in part, on assessment of the second mobile device's activity in accordance with the one or more prioritization criteria; and
causing establishment or adjustment of the communicative connection of the second mobile device in accordance with the another priority level.

\* \* \* \* \*